(12) United States Patent
Chuang et al.

(10) Patent No.: US 10,305,290 B2
(45) Date of Patent: May 28, 2019

(54) CURRENT REGULATION SYSTEM

(71) Applicant: MSI COMPUTER (SHENZHEN) CO.,LTD., Shenzhen, Guangdong Province (CN)

(72) Inventors: Chia-Sheng Chuang, Taipei (TW); Pei-Ching Kuo, New Taipei (TW); Wen-Chi Chen, Taipei (TW)

(73) Assignee: MSI COMPUTER (SHENZHEN) CO.,LTD., Shenzhen (CN)

( * ) Notice: Subject to any disclaimer, the term of this patent is extended or adjusted under 35 U.S.C. 154(b) by 351 days.

(21) Appl. No.: 15/234,935

(22) Filed: Aug. 11, 2016

(65) Prior Publication Data

US 2017/0346297 A1 Nov. 30, 2017

(30) Foreign Application Priority Data

May 27, 2016 (TW) .............................. 105116764 A

(51) Int. Cl.
*H02J 4/00* (2006.01)
*H02J 1/10* (2006.01)

(52) U.S. Cl.
CPC . *H02J 4/00* (2013.01); *H02J 1/10* (2013.01)

(58) Field of Classification Search
None
See application file for complete search history.

(56) References Cited

U.S. PATENT DOCUMENTS

| 2010/0164452 | A1* | 7/2010 | Ruan | ........................ | H02J 1/10 |
| | | | | | 323/282 |
| 2012/0025612 | A1* | 2/2012 | Tsai | ........................ | H02J 9/005 |
| | | | | | 307/52 |
| 2017/0126018 | A1* | 5/2017 | Buffenbarger | ............ | H02J 5/00 |

* cited by examiner

*Primary Examiner* — Jared Fureman
*Assistant Examiner* — Aqeel H Bukhari
(74) *Attorney, Agent, or Firm* — Maschoff Brennan

(57) ABSTRACT

A current regulation system includes a current regulation module and a current distribution module. The current regulation module is coupled to a first power source and a second power source. The current regulation module is configured to derive a first current from the first power source, and derive a second current from the second power source when coupled to a load. The current distribution module is coupled to the first power source, the second power source and the current regulation module. The current distribution module makes the current regulation module regulate the first current and the second current according to a first electric quantity of the first power source and second electric quantity of the second power source.

9 Claims, 2 Drawing Sheets

CURRENT REGULATION SYSTEM

CROSS-REFERENCE TO RELATED APPLICATIONS

This non-provisional application claims priority under 35 U.S.C. § 119(a) on Patent Application No(s). 105116764 filed in Taiwan, R.O.C. on May 27, 2016, the entire contents of which are hereby incorporated by reference.

TECHNICAL FIELD

The disclosure relates to a current regulation system, more particularly to a current regulation system for a plurality of power sources.

BACKGROUND

Electrical devices need electrical energy supplied by power modules to operate. Some electrical devices have to consume more electrical energy. Thus, more than one power module must be provided to those electrical devices which consume more electrical energy. However, in practice, each power module has different rate of power consumption. For example, two power modules are connected in parallel for supplying electrical energy to an electrical device. After a period of time, the two power modules retain different electric quantities. For example, one retains 80% electric quantity and the other one retains 70% electric quantity. When power modules retain different electric quantities, one of them will run out first. Therefore, the total output current can not meet the demand so that the total output of the power modules can not be optimized.

SUMMARY

According to one embodiment, the current regulation system includes a current regulation module and a current distribution module. The current regulation module is coupled to a first power source and a second power source and configured to derive a first current from the first power source and derive a second current from the second power source when coupled to a load. The current distribution module is coupled to the first power source, the second power source and the current regulation module. The current distribution module is configured to make the current regulation module regulate the first current and the second current according to a first electric quantity of the first power source and a second electric quantity of the second power.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
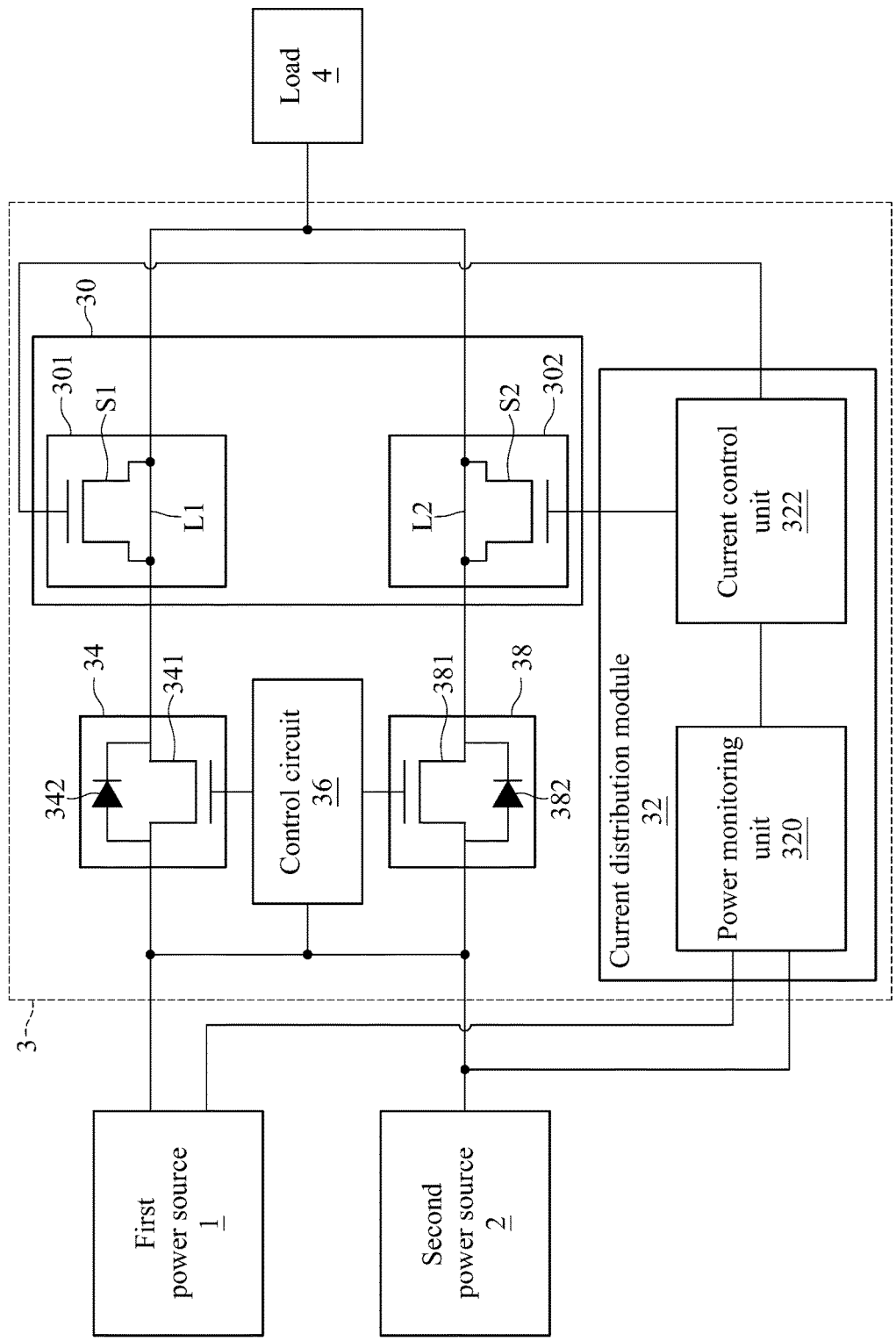
FIG. 1 is a block diagram of a current regulation system in an embodiment.

Please refer to FIG. 1. FIG. 1 is a block diagram of a current regulation system in an embodiment. As shown in FIG. 1, a current regulation system 3 includes a current regulation module 30 and a current distribution module 32. The current regulation module 30 is coupled to a first power source 1 and a second power source 2. In an example, both the first power source 1 and the second power source 2 are power modules for supplying a constant voltage, such as power adapters, power supplies or batteries. In this example, the first power source 1 and the second power source 2 are connected in parallel for supplying electrical energy to an electrical device in a load end. In another example, the first power source 1 and the second power source 2 independently supply electrical energy to an electrical device in a load end. In the embodiment of FIG. 1, the current regulation module 30 is configured to derive a first current C1 from the first power source 1 and derive a second current C2 from the second power source 2 when coupled to a load 4. The current regulation module 30 further sends the first current C1 regulated and the second current C2 regulated to the load 4. In an example, the load 4 is an electrical device adapted for receiving a constant voltage, such as a laptop, a virtual reality device or another electrical device adapted for receiving a constant voltage. In this example, the load 4 receives currents output by the first power source 1 and the second power source 2 for operation.

The current distribution module 32 is coupled to the first power source 1, the second power source 2 and the current regulation module 30. The current distribution module 32 is configured to make the current regulation module 30 regulate the first current C1 and the second current C2 according to a first electric quantity Q1 of the first power source 1 and a second electric quantity Q2 of the second power source 2. More specifically, the current distribution module 32 makes the current regulation module 30 regulate the value of the first current C1 and the value of the second current C2 based on the status of the first electric quantity Q1 retained in the first power source 1 and the status of the second electric quantity Q2 retained in the second power source 2. The current regulation module 30 further outputs the first current C1 regulated and the second current C2 regulated to the load 4. The first power source 1 and the second power source 2 mentioned in the above embodiment are used for illustrating. In other embodiments, the current regulation module 30 and the current distribution module 32 are coupled to a plurality of power sources. The disclosure is not limited to the number of power sources in the above embodiment.

In an embodiment, as shown in FIG. 1, the current distribution module 32 includes a power monitoring unit 320 and a current control unit 322. The power monitoring unit 320 is coupled to the first power source 1 and the second power source 2. The power monitoring unit 320 is configured to monitor the first electric quantity Q1 and the second electric quantity Q2 to generate a monitoring result. In other words, the power monitoring unit 320 can obtain the status information of the first electric quantity Q1 retained in the first power source 1 and the status information of the second electric quantity Q2 retained in the second power source 2, and generate the monitoring result according to the status information. For example, the power monitoring unit 320 monitors both the first electric quantity Q1 of the first power source 1 and the second electric quantity Q2 of the second power source 2, and then obtains the status information stating that the first electric quantity Q1 is 60% and the second electric quantity Q2 is 50%. The monitoring result contains the status information related to the first electric quantity Q1 and the second electric quantity Q2.

The current control unit 322 is coupled to the power monitoring unit 320. The current control unit 322 is configured to send a control command to the current regulation module 30 so that the current regulation module 30 regulates the first current C1 and the second current C2 according to the control command. More specifically, after the power monitoring unit 320 obtains the status information of the first electric quantity Q1 of the first power source 1 and the status information of the second electric quantity Q2 of the second power source 2 and then generates the monitoring result according to the status information, the monitoring result will be sent to the current control unit 322. At this moment, by the monitoring result, the current control unit 322 obtains the status information of the first electric quantity Q1 of the first power source 1 and the status information of the second electric quantity Q2 of the second power source 2. The current control unit 322 further generates a control command according to the status information of the first electric quantity Q1 and the status information of the second electric quantity Q2 and sends the control command to the current regulation module 30. At this moment, the current regulation module 30 regulates the first current C1 and the second current C2 according to the received control command. Note that the power monitoring unit 320 can not directly monitor the status information of the first electric quantity Q1 of the first power source 1 and the status information of the second electric quantity Q2 when both the first power source 1 and the second power source 2 are power adapters. At this moment, the current regulation module 30 will actively regulate the first current C1 and the second current C2 so that the value of the first current C1 and the value of the second current C2 are similar or the same.

In one embodiment, the current regulation module 30 includes a first regulation unit 301 and a second regulation unit 302. The first regulation unit 301 is coupled to the first power source 1, and the current control unit 322 and the load 4. The first regulation unit 301 is configured to receive the control command and regulate the first current C1 according to the control command. The second regulation unit 302 is coupled to the second power source 2, the current control unit 322 and the load 4. The second regulation unit 302 is configured to receive the control command and regulate the second current C2 according to the control command. In this embodiment, the current control unit 322 respectively sends the control command to the first regulation unit 301 and the second regulation unit 302. The first regulation unit 301 and the second regulation unit 302 respectively regulates the value of the first current C1 and the value of the second current C2 according to the control command. For example, assume the original value of the first current C1 is 1 ampere. The first regulation unit 301 can regulate the value of the first current C1 from 1 ampere to 0.8 ampere or regulate the value of the first current C1 from 1 ampere to 1.5 ampere. In another example, assume the original value of the second current C2 is 0.5 amp, the second regulation unit 302 can regulate the value of the second current C2 from 0.5 ampere to 0.4 ampere, or regulate the value of the second current C2 from 0.5 ampere to 0.6 ampere. The value of the current in the above embodiment is used for illustrating, and the present disclosure is not limited to it.

Each of the first regulation unit 301 and the second regulation unit 302 respectively has an individual impedance. The first regulation unit 301 and the second regulation unit 302 respectively regulate the first current C1 and the second current C2 by raising or lowering their impedances respectively. In an embodiment, the first regulation unit 301 includes a first wire L1 and a first switch S1. The first wire L1 is coupled to the first power source 1 and the load 4, and the first switch S1 is connected to the first wire L1 in parallel and controlled by the control command. The second regulation unit 302 includes a second wire L2 and a second switch S2. The second wire L2 is coupled to the second power source 2 and the load 4, and the second switch S2 is connected to the second wire L2 in parallel and controlled by the control command. In this embodiment, more specifically, the first regulation unit 301 determines whether to turn on the first switch S1 according to the control command. Similarly, the second regulation unit 302 determines whether to turn on the second switch S2 according to the control command. The switches mentioned above could be transistors, relays, mechanical switches or other equivalent electrical components capable of switching. The disclosure is not limited to the above embodiment.

In practice, each of the first wire L1 and the second wire L2 has an impedance, and each of the first switch S1 and the second switch S2 has an impedance. In other words, in this embodiment, the impedance of the first regulation unit 301 is formed by connecting the impedance of the first wire L1 and the impedance of first switch S1 in parallel. The impedance of the second regulation unit 302 is formed by connecting the impedance of the second wire L2 and the impedance of second switch S2 in parallel. Persons having ordinary skills in the art can realize that the impedance of a transistor in on-state is less than in off-state. In other words, the first regulation unit 301 and the second regulation unit 302 can respectively adjust their impedances by respectively determining whether to turn on the first switch S1 and the second switch S2, so that currents can be regulated. In an embodiment, both the first wire L1 of the first regulation unit 301 and the second wire L2 of the second regulation unit 302 are resistance wires. In other embodiments, both the first regulation unit 301 and the second regulation unit 302 include a plurality of switches.

Figure 2:
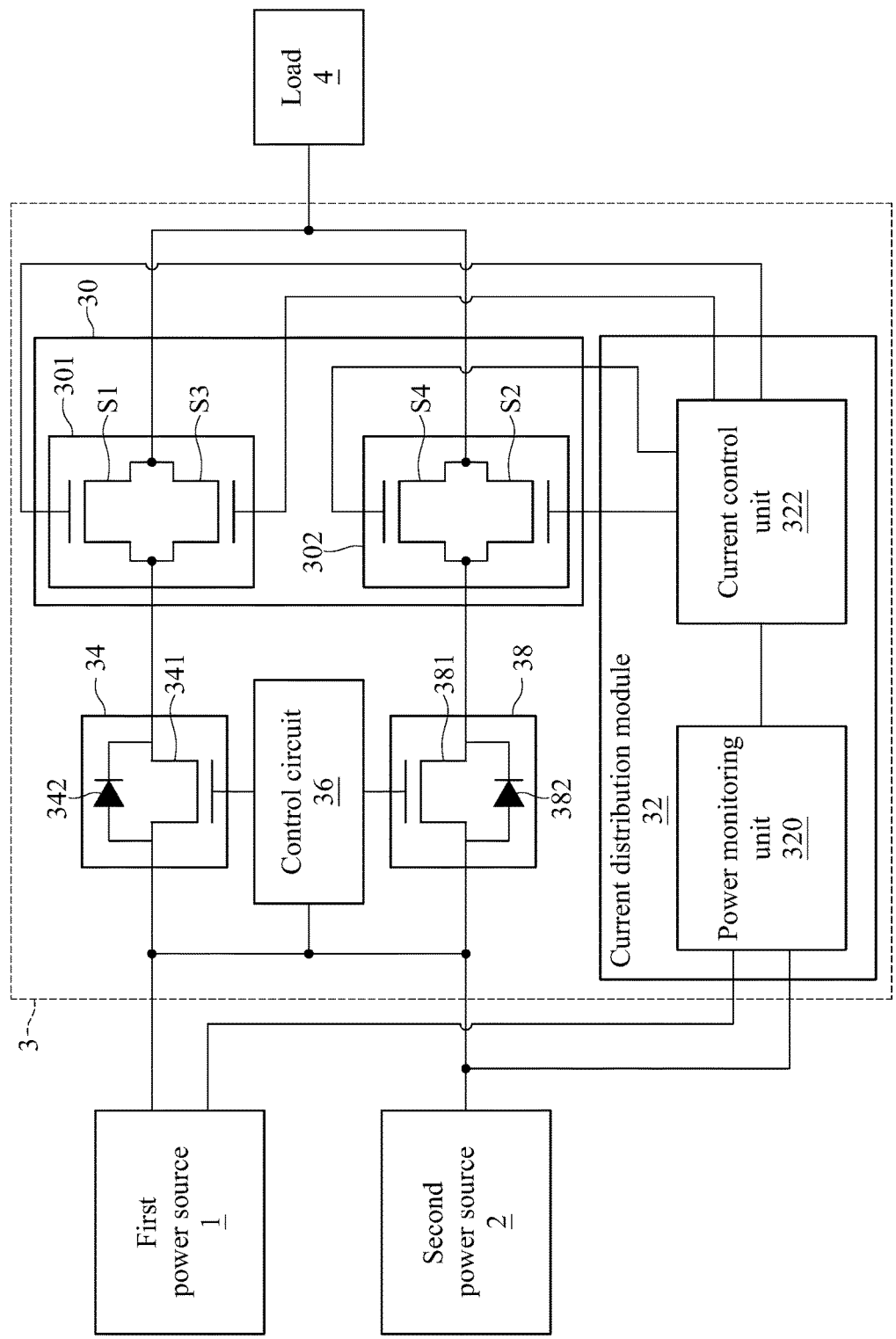
FIG. 2 is a block diagram of a current regulation system in another embodiment.

Please refer to FIG. 2. FIG. 2 is a block diagram of a current regulation system in another embodiment. As shown in FIG. 2, the first regulation unit 301 includes the first switch S1 and the third switch S3. The second regulation unit 302 includes the second switch S2 and the fourth switch S4. The first switch S1, the second switch S2, the third switch S3 and the fourth switch S4 are respectively controlled by the control command sent by the current control unit 322. In one embodiment, as shown in FIG. 2, the first wire L1 is connected to both the first switch S1 and the third switch S3 of the first regulation unit 301 in parallel. The second wire L2 is connected to both the second switch S2 and the fourth switch S4 of the second regulation unit 302 in parallel. In this embodiment, both the first wire L1 and the second wire L2 are resistance wires.

In one embodiment, the first regulation unit 301 turns on the first switch S1 when the monitoring result generated by the power monitoring unit 320 indicates that the first electric quantity Q1 is greater than the second electric quantity Q2, and the difference between the first electric quantity Q1 and the second electric quantity Q2 is greater than a first threshold. Therefore, the impedance of the first regulation unit 301 will decrease, and the current through the first regulation unit 301 will increase. At this time, the consumption rate of the first electric quantity Q1 of the first power source 1 is higher than the consumption rate of the second electric quantity Q2 of the second power source 2 so that the electric quantity of the first power source 1 and the electric quantity of the second power source 2 reach a balance.

In a practical example, assume the impedances of the first wire L1 and the second wire L2 are 2 milliohm. The impedances of the first switch S1 and the second switch S2 are 0.1 ohm when both the first switch S1 and the second switch S2 are turned on, and the impedances of the first switch S1 and the second switch S2 are 1 megaohm when both the first switch S1 and the second switch S2 are not turned on. Assume both the first switch S1 and the second switch S2 are in off-state, and then the impedances of the first regulation unit 301 and the second regulation unit 302 are approximately 1.999 milliohm. In this example, if the first electric quantity Q1 of the first power source 1 is 90% and the second electric quantity Q2 of the second power source 2 is 70%, then the difference between them is greater than the first threshold. At this time, the first switch S1 turns on the first switch S1. The impedance of the first switch S1 decreases from 1 mega ohm to 0.1 ohm, and the impedance of the first regulation unit 301 approximately decreases from 1.999 milliohm to 1.96 milliohm. In other words, the impedance of the first regulation unit 301 decreases, and the current through the first regulation unit 301 increases. The consumption rate of the first electric quantity Q1 of the first power source 1 is higher than the consumption rate of the second electric quantity Q2 of the second power source 2. After a period of time, the electric quantity of the first power source 1 and the electric quantity of the second power source 2 will become the same and then reach a balance.

In the aforementioned embodiment, determining whether to regulate the currents is based on the difference between the first electric quantity Q1 and the second electric quantity Q2. In another embodiment, determining whether to regulate the currents is based on the ratio of the first electric quantity Q1 to the second electric quantity Q2. The first regulation unit 301 turns on the first switch S1 when the monitoring result generated by the power monitoring unit 320 indicates that the first electric quantity Q1 is greater than the second electric quantity Q2, and the ratio of the first electric quantity Q1 to the second electric quantity Q2 is greater than a second threshold. In a practical example, assume the first electric quantity Q1 of the first power source 1 is 80%, and the second electric quantity Q2 of the second power source 2 is 60%. Assume the second threshold is 1.1. The ratio of the first electric quantity Q1 to the second electric quantity Q2 is approximately 1.33, which is greater than the second threshold. At this time, the first regulation unit 301 turns on the first switch S1 so that the impedance of the first regulation unit 301 decreases and the current through the first regulation unit 301 increases. Then the first electric quantity Q1 and the second electric quantity Q2 reach a balance. The way to make the impedance of the first regulation unit 301 decrease by turning on the first switch S1 in this embodiment is the same in the aforementioned embodiment and thus, is not repeated here.

On the contrary, in one embodiment, the second regulation unit 302 turns on the second switch S2 when the monitoring result generated by the power monitoring unit 320 indicates that the second electric quantity Q2 is greater than the first electric quantity Q1, and the difference between the second electric quantity Q2 and the first electric quantity Q1 is greater than the first threshold. In another embodiment, the second regulation unit 302 turns on the second switch S2 when the monitoring result generated by the power monitoring unit 320 indicates that the second electric quantity Q2 is greater than the first electric quantity Q1, and the ratio of the second electric quantity Q2 to the first electric quantity Q1 is greater than the second threshold.

In one embodiment, the current regulation system 3 further includes a first switch unit 34, a second switch unit 38 and a control circuit 36. As shown in FIG. 1, the first switch unit 34 is coupled to the first power source 1 and the current regulation module 30. The second switch unit 38 is coupled to the second power source 2 and the current regulation module 30. The control circuit 36 is coupled to the first switch unit 34 and the second switch unit 38. The control circuit 36 is configured to selectively turn on the first switch unit 34 or the second switch unit 38 according to a difference between a first output voltage V1 output by the first power source 1 and a second output voltage V2 output by the second power source 2 and a third threshold. The control circuit 36 controls a first turn-on impedance of the first switch unit 34 and a second turn-on impedance of the second switch unit 38 to generate the first output voltage regulated V1' or the second output voltage regulated V2'. The first output voltage regulated V1' corresponds to the first current C1, and the second output voltage regulated V2' corresponds to the second current C2.

More specifically, in an example, electrical energy will be consumed unnecessarily when the difference between the first output voltage V1 and the second output voltage V2 respectively output by the first power source 1 and the second power source 2 is significant. At this time, both the first output voltage V1 and the second output voltage V2 can be regulated to reduce electrical energy consumption by using the first switch unit 34, the second switch unit 38 and the control circuit 36 in this embodiment. In an embodiment, the first switch unit 34 includes a first transistor 341 and a first diode 342. The second switch unit 38 includes a second transistor 381 and a second diode 382. The control circuit 36 selectively turns on the first transistor 341 of the first switch unit 34 or the second transistor 381 of the second switch unit 38 according to the difference between the first output voltage V1 and the second output voltage V2 and the third threshold.

In an example, assume the third threshold is 0.6 volt, the first output voltage V1 is 19 volt and the second output voltage V2 is 18.2 volt. The difference between the first output voltage V1 and the second output voltage V2 is greater than the third threshold. At this time, the second transistor 381 is in off-state. Only the first power source 1 supplies electrical energy to the load end, and the second power source 2 does not supply electrical energy to the load end. Then the first output voltage regulated V1' and the second output voltage regulated V2' become close and reach a balance.

In another embodiment, the first output voltage V1 is greater than the second output voltage V2, and the difference between the first output voltage V1 and the second output voltage V2 is less than the third threshold. At this time, the control circuit 36 turns on both the first transistor 341 of the first switch unit 34 and the second transistor 381 of the second switch unit 38. The control circuit 36 controls the first turn-on impedance of the first switch unit 34 and the second turn-on impedance of the second switch unit 38 to generate the first output voltage regulated V1' and the second output voltage regulated V2'. The voltage value of the first output voltage regulated V1' is similar to the voltage value of the second output voltage regulated V2'. For example, assume the third threshold is 0.6 volt, the first output voltage V1 is 19 volt and the second output voltage V2 is 18.9 volt. The difference between the first output voltage V1 and the second output voltage V2 is 0.1 volt, which is less than the third threshold. At this time, both the first transistor 341 of the first switch unit 34 and the second transistor 381 of the second switch unit 38 are turned on. The control circuit 36 decreases the gate voltage of the first transistor 341 to increase the first turn-on impedance of the first switch unit 34. Then the first output voltage regulated V1' and the second output voltage regulated V2' are generated to reach a voltage balance. The value of the first output voltage regulated V1' is similar to the value of the second output voltage regulated V2'. In one embodiment, the first output voltage regulated V1' output from the first switch unit 34 corresponds to the first current C1, and the second output voltage regulated V2' output from the second switch unit 38 corresponds to the second current C2. The current regulation module 30 respectively regulates the first current C1 and the second current C2 so that the electric quantity of the first power source 1 and the electric quantity of the second power source 2 reach a balance.

Based on the description above, in the operation of the current regulation system 3, the power monitoring unit 320 monitors both the first power source 1 and the second power source 2, and then obtains the status of the first electric quantity Q1 of the first power source 1 and the second electric quantity Q2 of second power source 2 to generate a monitoring result. Then the current control unit 322 regulates the first current C1 and the second current C2 according to the monitoring result so that the total output of the first power source 1 and the second power source 2 can be optimized. Through the first switch unit 34, the second switch unit 38 and the control circuit 36, the first output voltage V1 output from the first power source 1 and the second output voltage V2 output from the second power source 2 are correspondingly converted to the first output voltage regulated V1' and the second output voltage regulated V2' to reach a voltage balance so that electrical energy consumption is decreased.

What is claimed is:

1. A current regulation system, comprising:
    a current regulation module coupled to a first power source and a second power source and configured to derive a first current from the first power source and derive a second current from the second power source when coupled to a load; and
    a current distribution module coupled to the first power source, the second power source and the current regulation module and configured to make the current regulation module regulate the first current and the second current according to a threshold and a monitoring result, with the monitoring result indicating a difference or a ratio between a first electric quantity of the first power source and a second electric quantity of the second power source.

2. The current regulation system according to claim 1, wherein the current distribution module comprises:
    a power monitoring unit coupled to the first power source and the second power source and configured to monitor the first electric quantity and the second electric quantity to generate the monitoring result; and
    a current control unit coupled to the power monitoring unit and configured to send a control command to the current regulation module to make the current regulation module regulate the first current and the second current according to the monitoring result.

3. The current regulation system according to claim 2, wherein the current regulation module comprises:
    a first regulation unit coupled to the first power source, the current control unit and the load and configured to receive the control command and regulate the first current according to the control command; and
    a second regulation unit coupled to the second power source, the current control unit and the load and configured to receive the control command and regulate the second current according to the control command.

4. The current regulation system according to claim 3, wherein the first regulation unit comprises:
    a first wire coupled to the first power source and the load; and
    a first switch connected to the first wire in parallel and controlled by the control command.

5. The current regulation system according to claim 4, wherein the threshold is defined as a first threshold, the first switch is turned on by the first regulation unit when the monitoring result is that the first electric quantity is greater than the second electric quantity and a difference between the first electric quantity and the second electric quantity is greater than the first threshold.

6. The current regulation system according to claim 4, wherein the threshold is defined as a second threshold, the first switch is turned on by the first regulation unit when the monitoring result is that the first electric quantity are greater than the second electric quantity and a ratio of the first electric quantity to the second electric quantity is greater than the second threshold.

7. The current regulation system according to claim 1, further comprising:
    a first switch unit coupled to the first power source and the current regulation module;
    a second switch unit coupled to the second power source and the current regulation module; and
    a control circuit coupled to the first switch unit and the second switch unit and configured to selectively turn on the first switch unit or the second switch unit according to a difference between a first output voltage output by the first power source and a second output voltage output by the second power source and another threshold, and control a first turn-on impedance of the first switch unit and a second turn-on impedance of the second switch unit to generate the first output voltage regulated or the second output voltage regulated, wherein the first output voltage regulated corresponds to the first current, and the second output voltage regulated corresponds to the second current.

8. The current regulation system according to claim 7, wherein the first switch unit comprises a first transistor and a first diode, the second switch unit comprises a second transistor and a second diode, the control circuit selectively turns on the first transistor of the first switch unit or the second transistor of the second switch unit according to a difference between the first output voltage and the second output voltage and the another threshold.

9. The current regulation system according to claim 8, wherein the first transistor of the first switch unit is turned on by the control circuit when the first output voltage is greater than the second output voltage and the difference between the first output voltage and the second output voltage is greater than the another threshold.

* * * * *